US 11,147,151 B2

(12) United States Patent
Demura

(10) Patent No.: US 11,147,151 B2
(45) Date of Patent: Oct. 12, 2021

(54) ROTARY ANODE TYPE X-RAY TUBE APPARATUS COMPRISING ROTARY ANODE DRIVING DEVICE

(71) Applicant: Shimadzu Corporation, Kyoto (JP)

(72) Inventor: Yasuhiro Demura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/405,926

(22) Filed: May 7, 2019

(65) Prior Publication Data

US 2020/0357598 A1 Nov. 12, 2020

(51) Int. Cl.
*H05G 1/66* (2006.01)
*H01J 35/10* (2006.01)
(Continued)

(52) U.S. Cl.
CPC .............. *H05G 1/66* (2013.01); *H01J 35/02* (2013.01); *H01J 35/025* (2013.01); *H01J 35/06* (2013.01);
(Continued)

(58) Field of Classification Search
CPC .......... H01J 35/02; H01J 35/025; H01J 35/06; H01J 35/10; H01J 35/101; H01J 35/24; H01J 35/26; H05G 1/08; H05G 1/10; H05G 1/12; H05G 1/18; H05G 1/20; H05G 1/22; H05G 1/24; H05G 1/26; H05G 1/265; H05G 1/30; H05G 1/32; H05G 1/66
(Continued)

(56) References Cited

U.S. PATENT DOCUMENTS 3,963,930 A * 6/1976 Fiocca ............... H05G 1/66
378/94
4,065,673 A * 12/1977 Fiocca ............... H01J 35/025
378/93
(Continued)

FOREIGN PATENT DOCUMENTS

JP 60-198099 A 10/1985
JP H01-241797 A 9/1989
(Continued)

OTHER PUBLICATIONS

An English translation of JP2013-37998A by Patent Translate.*
Office Action from the JPO, dated Nov. 19, 2019, for the counterpart Japanese Patent Application No. 2016-216132.

*Primary Examiner* — Allen C. Ho
(74) *Attorney, Agent, or Firm* — Muir Patent Law, PLLC

(57) ABSTRACT

A rotary anode driving device includes a DC power supply, an inverter circuit which is connected to the DC power supply and includes a plurality of switching elements and, the inverter circuit generates an AC voltage from a DC voltage of the DC power supply, and outputs the AC voltage to a stator coil which generates a rotating magnetic field of an X-ray tube; a pulse width modulation (PWM) waveform generator configured to generate an AC voltage of two phases or three phases as the AC voltage from the DC voltage by performing PWM control of the switching elements of the inverter circuit; and a capacitor connected in series to an input side of a stator coil of at least one phase of the stator coil, the capacitor having an electrostatic capacitance constituting a series resonant circuit with the stator coil to which the capacitor is connected.

11 Claims, 6 Drawing Sheets

(51) Int. Cl.

| | | |
|---|---|---|
| *H01J 35/24* | (2006.01) | |
| *H01J 35/26* | (2006.01) | |
| *H02M 7/515* | (2007.01) | |
| *H05G 1/22* | (2006.01) | |
| *H05G 1/08* | (2006.01) | |
| *H05G 1/26* | (2006.01) | |
| *H05G 1/12* | (2006.01) | |
| *H05G 1/18* | (2006.01) | |
| *H05G 1/24* | (2006.01) | |
| *H05G 1/30* | (2006.01) | |
| *H01J 35/02* | (2006.01) | |
| *H01J 35/06* | (2006.01) | |
| *H05G 1/20* | (2006.01) | |
| *H05G 1/10* | (2006.01) | |
| *H05G 1/32* | (2006.01) | |

(52) U.S. Cl.
CPC ............ *H01J 35/10* (2013.01); *H01J 35/101* (2013.01); *H01J 35/24* (2013.01); *H01J 35/26* (2013.01); *H02M 7/515* (2013.01); *H05G 1/08* (2013.01); *H05G 1/10* (2013.01); *H05G 1/12* (2013.01); *H05G 1/18* (2013.01); *H05G 1/20* (2013.01); *H05G 1/22* (2013.01); *H05G 1/24* (2013.01); *H05G 1/26* (2013.01); *H05G 1/265* (2013.01); *H05G 1/30* (2013.01); *H05G 1/32* (2013.01); *H01J 2235/1026* (2013.01)

(58) Field of Classification Search
USPC ........................... 378/91, 125, 131, 132, 144
See application file for complete search history.

(56) References Cited

U.S. PATENT DOCUMENTS

| | | | | |
|---|---|---|---|---|
| 4,768,216 A * | 8/1988 | Harvey | ................... | H05G 1/265 363/17 |
| 4,797,907 A * | 1/1989 | Anderton | ................. | H05G 1/10 378/101 |
| 4,829,551 A * | 5/1989 | Resnick | .................. | H05G 1/66 378/131 |
| 5,140,246 A * | 8/1992 | Rarick | ...................... | H02P 1/44 318/400.2 |
| 6,738,275 B1 * | 5/2004 | Beland | .................. | H02M 1/088 363/71 |
| 7,224,768 B2 * | 5/2007 | Domoto | ................... | H05G 1/56 378/93 |
| 7,336,766 B2 * | 2/2008 | Kitami | ..................... | H05G 1/66 378/101 |
| 7,400,708 B2 * | 7/2008 | Takahashi | ................ | H05G 1/10 378/101 |
| 7,952,309 B2 * | 5/2011 | Nishimura | ............ | B60L 15/025 318/400.24 |
| 8,040,096 B2 * | 10/2011 | Taniguchi | ............... | H02M 1/32 318/490 |
| 8,044,620 B2 * | 10/2011 | Sakai | ........................ | H02P 6/08 318/400.17 |
| 8,054,031 B2 * | 11/2011 | Uechi | ..................... | H02P 29/68 318/800 |
| 8,189,742 B2 * | 5/2012 | Behling | .................. | H01J 35/14 378/137 |
| 8,249,217 B2 * | 8/2012 | Iijima | ..................... | H05G 1/20 378/101 |
| 8,542,800 B2 * | 9/2013 | Biehr | ..................... | H01J 35/101 378/131 |
| 8,588,371 B2 * | 11/2013 | Ogawa | ..................... | H05G 1/20 378/101 |
| 9,036,784 B2 * | 5/2015 | Oketa | .................... | H02H 7/122 378/109 |
| 9,042,518 B2 * | 5/2015 | Fürst | ........................ | H05G 1/30 378/125 |
| 9,107,280 B2 * | 8/2015 | Hishikawa | ................ | H02P 3/20 |
| 9,742,237 B2 * | 8/2017 | Toyoda | ..................... | H02P 6/00 |
| 9,877,694 B2 * | 1/2018 | Honda | ..................... | H05G 1/54 |
| 9,900,971 B2 * | 2/2018 | Shindo | ..................... | H05G 1/56 |
| 10,003,295 B2 * | 6/2018 | Saha | ....................... | H02M 1/36 |
| 10,660,189 B2 * | 5/2020 | Ishiyama | ................ | H05G 1/18 |

FOREIGN PATENT DOCUMENTS

| | | | | |
|---|---|---|---|---|
| JP | 2002-093596 A | 3/2002 | | |
| JP | 4262810 B2 | 5/2009 | | |
| JP | 2013-37998 A * | 2/2013 | ............... | H05G 1/66 |

* cited by examiner

ROTARY ANODE TYPE X-RAY TUBE APPARATUS COMPRISING ROTARY ANODE DRIVING DEVICE

BACKGROUND OF THE INVENTION

1. Field of the Invention

The present invention relates to a rotary anode type X-ray tube apparatus used for a general X-ray apparatus or a medical X-ray diagnostic apparatus such as an X-ray CT apparatus, and to an anode rotary driving device for the rotary anode type X-ray tube apparatus.

2. Description of the Related Art

In a rotary anode type X-ray tube (hereinafter may be simply referred to as an X-ray tube), in order to increase an allowable load of an anode by moving an electron impact surface, the anode is rotated with an anode rotary driving device using the principle of induction motor. The X-ray tube includes a rotor coil on a rotary shaft of the anode supported rotatably by the rotary shaft in the X-ray tube, includes a stator coil outside the X-ray tube, and makes a current flow through the stator coil to generate a rotating magnetic field, thereby rotating the anode via the rotor coil.

Depending on the number of phases of the stator coil, the anode rotary driving device can be divided into a two-phase type and a three-phase type (see Japanese Patent No. 4262810). In either of the anode rotary driving devices, a DC voltage from a DC voltage power supply is converted into an AC voltage by an inverter circuit. Then, in the two-phase type, a two-phase AC signal having a phase difference of 90 degrees is applied to the stator coil, and in the three-phase type, a three-phase AC signal having a phase difference of 120 degrees is applied to the stator coil. The two-phase type has an advantage that the stator coil can be manufactured simply and inexpensively, and the three-phase type has an advantage of being favorable for high-speed response.

SUMMARY OF THE INVENTION

There is a maximum voltage output from the DC power supply connected to the inverter circuit as a factor for determining the upper limit of the AC voltage from the inverter circuit applied to the stator coil of the anode rotary driving device.

There are operating modes such as high-speed operation, low-speed operation, rotation maintenance, startup, braking, and stop in the anode rotary driving device of any number of phases. The magnitude of the AC voltage sent from the inverter circuit to the stator coil is regulated according to each operating mode, and the magnitude of the AC voltage is controlled by pulse width modulation (PWM) of the inverter circuit. Normally, the highest AC voltage is needed in the high-speed operating mode. Therefore, the DC power supply has a structure sufficient to output this highest AC voltage.

Further, for example, among two-phase type anode rotary driving devices, there are ones in which a main coil and an auxiliary coil are provided as stator coils, and the auxiliary coil is wound more than the main coil. An important factor for generating the torque to rotate the anode is not the voltage applied to the stator coil but the current flowing through the stator coil, more specifically the rotating magnetic field generated by the current. When the number of windings of the coil is large, an impedance generally increases in proportion to the square of the number of windings. If it is attempted to equalize the amplitude of magnetic flux generated by the current between the main coil and the auxiliary coil, it becomes necessary to apply a voltage higher than that of the main coil to the auxiliary coil. Also in this case, it is necessary to have a DC power supply capable of outputting a voltage capable of making a current flow that is needed by the auxiliary coil.

Further, when the DC voltage is converted to two-phase AC voltages to be supplied to the main coil and the auxiliary coil by the inverter circuit, the more the phase difference between the two-phase AC voltages deviates from the ideal phase difference, that is, 90°, the more it becomes difficult to obtain a large voltage as a peak value of the AC voltage, and in order to obtain a necessary peak voltage, a high voltage is necessary for the DC voltage before being converted by the inverter circuit.

The necessary amplitude of the AC voltage applied to the stator coil varies depending on the type of the X-ray tube besides the operating mode.

Thus, as the DC power supply connected to the inverter circuit, it is necessary to have one capable of outputting a sufficient high voltage to satisfy the requirement of the maximum value of the AC voltage applied from the inverter circuit to the stator coil, which leads to problems that the ratio of the cost of the DC power supply in the anode rotary driving device increases, the withstanding voltage of switching elements included in the inverter circuit increases, and the size of the anode rotary driving device increases.

In order to solve such problems, it is an object of the present invention to make it possible to configure the maximum value of the AC voltage applied from the inverter circuit to the stator coil by the DC power supply connected to the inverter circuit of a low voltage.

The anode rotary driving device of the present invention is intended for both two-phase and three-phase types.

An anode rotary driving device of the present invention includes a DC power supply, an inverter circuit which is connected to the DC power supply and includes a plurality of switching elements, the inverter circuit generates an AC voltage from a DC voltage of the DC power supply, and outputs the AC voltage to a stator coil generating a rotating magnetic field of an X-ray tube, a pulse with modulation (PWM) waveform generator configured to generate an AC voltage of two phases or three phases as the AC voltage from the DC voltage by performing PWM control of the switching elements of the inverter circuit, and a capacitor connected in series to an input side of a stator coil of at least one phase of the stator coil, the capacitor having an electrostatic capacitance constituting a series resonant circuit with the stator coil to which the capacitor is connected.

In the present invention, by constituting a series resonant circuit by connecting a capacitor in series to the input side of the stator coil, the AC voltage applied to the stator coil has a higher amplitude than that applied directly from the inverter circuit, and the phase thereof is advanced from the phase of the AC voltage applied directly from the inverter circuit. This will be explained with reference to FIGS. 2 and 3.

As illustrated in FIG. 2, a series LCR circuit in which a capacitor is connected in series to the stator coil will be considered. It is assumed that an impedance of the LCR circuit is Z and a power factor angle thereof is θ. Assuming that an impedance of an LR series part as a stator part is Zs and a power factor angle thereof is φ in the LCR circuit, the following relation holds.

$$Z = R + j\left(\omega L - \frac{1}{\omega C}\right)$$

$$\Rightarrow |Z| = \sqrt{R^2 + \left(\omega L - \frac{1}{\omega C}\right)^2}, \quad \tan\varphi = \frac{\left(\omega L - \frac{1}{\omega C}\right)}{R}$$

$$Z_s = R + j\omega L$$

$$\Rightarrow |Z_s| = \sqrt{R^2 + (\omega L)^2}, \quad \tan\phi = \frac{\omega L}{R}$$

Letting an applied voltage of LCR be $v_1 = V_0 \sin \omega t$ and an applied voltage of the stator be $v_s$ (amplitude $V_s$, advancing phase $\alpha$), when $$v_s = v_1 \frac{|Z_s|}{|Z|} e^{j(\phi-\varphi)} = \frac{|Z_s|}{Z} V_0 * \sin(\omega t + \phi - \varphi)$$

$$\frac{|Z_s|}{|Z|} = \frac{\sqrt{R^2 + (\omega L)^2}}{\sqrt{R^2 + \left(\omega L - \frac{1}{\omega C}\right)^2}}$$

and a resonance condition is $$\omega = \frac{1}{\sqrt{LC}}$$

the amplitude Vs of vs is as follows $$V_0 \frac{|Z_s|}{|Z|} = V_0 \frac{\sqrt{R^2 + (\omega L)^2}}{R}$$

When $$\tan(\phi - \varphi) = \frac{\tan\phi - \tan\varphi}{1 + \tan\phi * \tan\varphi} = \frac{\frac{R}{\omega C}}{R^2 + \omega L\left(\omega L - \frac{1}{\omega C}\right)}$$

and a resonance condition is $$\omega = \frac{1}{\sqrt{LC}}$$

then $$\tan\alpha = \tan(\phi - \varphi) = \frac{\frac{1}{\omega C}}{R} = \frac{1}{\omega CR}$$

and the phase advances.

This can be represented by a vector diagram as illustrated in FIG. 3.

Here, the term "constituting a series resonant circuit" includes not only those strictly satisfying the resonance condition as expressed by the above equation but also cases of deviating in some degree therefrom. For example, even if the electrostatic capacitance of the capacitor is set in advance so as to strictly satisfy the resonance condition, due to a ratio of difference (=slip) between the rotational frequency of the rotor coil of the X-ray tube and the driving frequency of the AC voltage supplied to the stator coil from the inverter circuit, an impedance (including inductance) of the input circuit from the inverter circuit to the stator coil changes, and hence, the resonance condition is no longer strict. The present invention includes such cases, and does not require strict resonance conditions. In short, "constituting a series resonant circuit" covers all the cases where, by connecting the capacitor in series to the stator coil, the amplitude of the AC voltage applied to the stator coil becomes larger by resonance than in the case where the capacitor is not connected.

The present invention is characterized in that the capacitor is connected in series to the input side of the stator coil to constitute a series resonant circuit. However, connection of the capacitor in series to the input side of the stator coil itself is also made in a conventional two-phase anode rotary mechanism.

In FIG. 13A of Japanese Patent No. 4262810, for example, two outputs of a single-phase full bridge inverter circuit 21 are supplied to a main coil as Vmain, to a common end of both coils as Vcom, and to an auxiliary coil as Vsub. At that time, in order to shift the phase of Vsub from Vmain by 90°, a capacitor 50 is inserted in series to the auxiliary coil. However, as apparent from the fact that it is named "phase shift capacitor 50", this capacitor 50 is inserted to shift the phase by 90°, and there is neither description nor suggestion of constituting the series resonant circuit by the capacitor 50 and the auxiliary coil.

Also in FIGS. 1 and 3 of Japanese Patent Application Laid-Open No. 60-198099, connection of a capacitor 3C in series to an auxiliary coil of a stator coil of a two-phase anode rotary mechanism is described, but there is nothing described about for what reason the capacitor 3C is provided. In view of the fact that the two-phase anode rotary mechanism has the same configuration as that of Japanese Patent No. 4262810 and the capacitor 3C is connected in series to the auxiliary coil of the stator coil, correspondingly, this capacitor 3C is also considered as a phase shift capacitor for shifting the phase by 90°. Also in Japanese Patent Application Laid-Open No. 60-198099, there is neither description nor suggestion of constituting the series resonant circuit by the capacitor 3C and the auxiliary coil.

A rotary anode type X-ray tube apparatus of the present invention includes an X-ray tube, an anode disposed in the X-ray tube and having a target rotatably supported by a rotary shaft, a rotor attached to the rotary shaft in the X-ray tube, a cathode disposed to oppose the target in the X-ray tube and irradiating the target with an electron beam, a stator coil disposed outside the X-ray tube and generating a rotating magnetic field with respect to the rotor, and a rotary anode driving device applying an AC voltage to the stator coil, and includes the rotary anode driving device of the present invention as the rotary anode driving device.

By connecting a capacitor in series to at least a single-phase stator coil so as to use a series resonance phenomenon, the rotary anode driving device of the present invention enables to use a low-voltage DC power supply that can only generate an AC voltage smaller than the AC voltage necessary for making a current flow from the inverter circuit to an impedance of the stator coil. As a result, it is possible to reduce the cost and size of the rotary anode driving device itself.

DETAILED DESCRIPTION OF THE INVENTION

Figure 1:
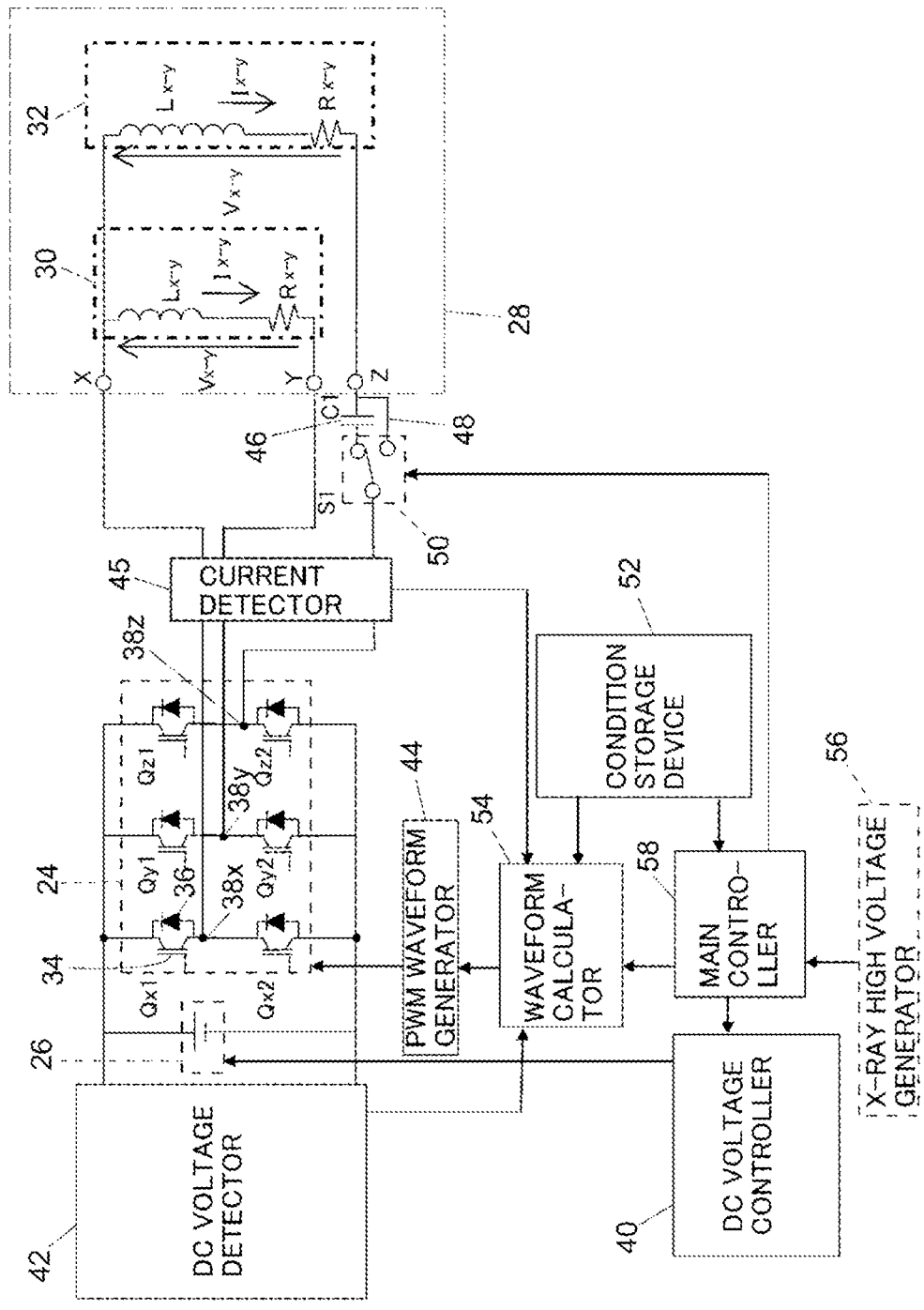
FIG. 1 is a circuit diagram illustrating a first embodiment of a rotary anode driving device.
Figure 2:
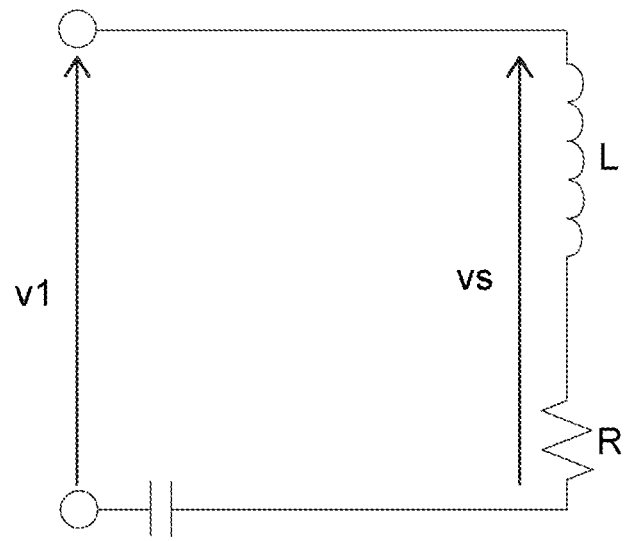
FIG. 2 is a series LCR circuit diagram.
Figure 3:
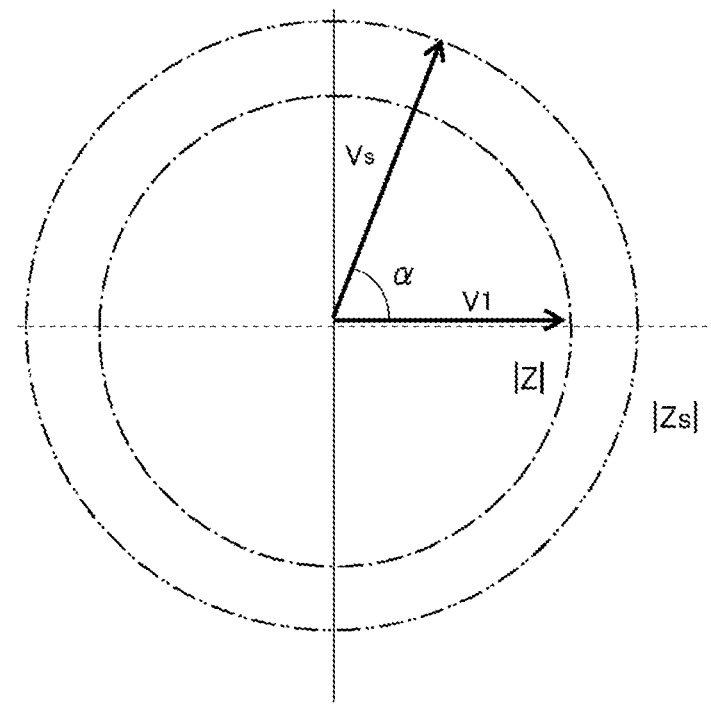
FIG. 3 is a vector diagram illustrating a change in amplitude and phase by a series resonance.

A stator coil to which a capacitor is connected in series can also use a series resonance in a state that the capacitor is connected thereto across all of the operating modes such as high-speed operation, low-speed operation, or rotation maintenance. However, such as when in low-speed operation, there may be cases where it is unnecessary to apply an AC voltage having an amplitude equal to or higher than that of a DC power supply voltage to the stator coil.

One embodiment allows to select whether a capacitor is connected to a stator coil or not according to an operating mode, and includes a bypass circuit connected in parallel to the capacitor, and a switching mechanism disposed on an input side of the capacitor and selectively connecting an output of an inverter circuit to either the capacitor or the bypass circuit.

In the case where such a switching mechanism is provided, a switching operation according to the operating mode can be instructed from outside each time, but it can also be instructed automatically according to a predetermined program. An embodiment for performing such automation further includes a controller controlling a switching operation of the switching mechanism. The controller controls the switching operation of the switching mechanism to select the capacitor when it is in an operating mode which needs a voltage higher than an output voltage of the DC power supply, and to select the bypass circuit when it is in an operating mode in which a voltage equal to or lower than the output voltage of the DC power supply suffices.

An X-ray tube to which the present invention is directed includes two-phase and three-phase types. An example of a two-phase type X-ray tube also includes one having a two-phase stator coil constituted of a first stator coil and a second stator coil having a larger number of windings than the first stator coil. In this case, since the second stator coil needs an AC voltage with a larger amplitude, that is, a driving voltage with a larger amplitude than the first stator coil, a capacitor for resonance is connected in series at least to the second stator coil.

Specifically, it is an X-ray tube apparatus having two-phase stator coils, which has a main coil and an auxiliary coil having different impedances due to the number of windings of the stator coil. The auxiliary coil has a larger number of windings than the main coil, and also has a larger impedance. The main coil corresponds to the first stator coil, and the auxiliary coil corresponds to the second stator coil. Also in this case, since the driving voltage supplied to the auxiliary coil is increased by resonance, even if an output voltage that satisfies a driving voltage necessary for making a current for giving rotational torque flow through the auxiliary coil is not provided as the DC power supply connected to the inverter circuit, it becomes possible to use a DC power supply having an output voltage that can be increased to the driving voltage by resonance.

In the two-phase type X-ray tube of this example, it is also possible to configure a capacitor having an electrostatic capacitance constituting a series resonant circuit with the first stator coil is also connected in series to an input side of the first stator coil, and as the capacitor connected to the second stator coil, one having a larger electrostatic capacitance than the capacitor connected to the first stator coil is connected. In this case, even if there is no DC power supply of an output voltage that satisfies a driving voltage necessary for making a current for giving rotational torque flow through the first stator coil, it becomes possible to use a DC power supply having an output voltage that can be increased to the driving voltage by resonance, and it becomes further possible to use a DC power supply of a low voltage.

The X-ray tube to which the present invention is directed is not necessarily limited to one provided with stator coils having different numbers of windings. In other words, the present invention is also directed to one having two-phase or three-phase stator coils in which all the stator coils have the same number of windings. In that case, the capacitor constituting the resonant circuit is connected to all the stator coils. Further, a bypass circuit may be provided in parallel to each capacitor and a switching mechanism selectively connecting the output of the inverter circuit to either each capacitor or each bypass circuit may be provided on the input side of each capacitor, and a resonance phenomenon may be utilized by selecting the capacitor only when a driving voltage with a large amplitude is necessary as in high-speed operation.

In the case where a capacitor constituting the resonant circuit is connected only to a stator coil of some phases, the phase of the current flowing through the stator coil to which the capacitor is connected and caused resonance advances. Normally, in the two-phase type X-ray tube, the current phase difference between the two-phase stator coils is set to 90°, and in the three-phase type X-ray tube, the current phase difference between the three-phase stator coils is set to 120°. In each case, rotational torque generated between the stator coils and the rotor is maximized. However, when an anode rotational frequency changes, the phase difference between the current flowing through the stator coil to which the capacitor is connected and the current flowing through the stator coil to which the capacitor is not connected deviates from a preset current phase difference, and a reduction in rotational torque or the like occurs. Therefore, preferably, pulse width modulation (PWM) control of the inverter circuit is regulated so as to maintain the current phase difference between the stator coils to a predetermined phase difference. The predetermined phase difference is approximately 90° for the two-phase X-ray tube and approximately 120° for the three-phase X-ray tube.

In the present invention, it is preferred to further include a phase difference regulator configured to maintain a current phase difference between the stator coils to a predetermined phase difference.

An example of such a phase difference regulator includes a current detector detecting a phase of a current flowing through each of the stator coils, the PWM waveform generator, and a waveform calculator controlling the inverter circuit via the PWM waveform generator so as to suppress or eliminate a deviation of the phase difference between the stator coils from a predetermined phase difference based on a phase of a current flowing through each of the stator coils detected by the current detector.

In the present invention, a capacitor is connected to at least a stator coil of one phase to constitute a resonant circuit, and a driving voltage applied to the stator coil is increased by the DC voltage of the DC power supply connected to the inverter circuit. Therefore, it is also preferred to assume a situation that the increased driving voltage exceeds the withstand voltage of the stator coil. In an embodiment for this purpose, by devising the PWM voltage waveform to be input to the stator coil to which the capacitor is connected, the peak voltage of the driving voltage is suppressed, so as to reduce the risk of dielectric breakdown of the stator coil. For example, the PWM voltage output from the inverter circuit to the stator coil to which the capacitor is connected in series is not sinusoidal ($v=v_0 \sin(\omega t)$) but is set to zero in part of the range of $\omega t$ of 0° to 90° and 180° to 270°. In this manner, it is possible to reduce the peak voltage applied to the stator coil with respect to a time domain in which the voltage applied to the stator coil is dominant in the voltage between series capacitors.

Specifically, in one embodiment, there is further provided a waveform calculator controlling the inverter circuit via the PWM waveform generator, with respect to the AC voltage from the inverter circuit output to the stator coil to which the capacitor is connected, so as to make a duty ratio zero when an average value of the PWM voltage (rectangular wave) is in an area of a preset ratio (for example, 5%) or less of an applied voltage average value indicated by a sinusoidal wave of dashed line of FIG. 6B and a polarity thereof is the same as that of the voltage between the capacitors.

Embodiment

Figure 4:
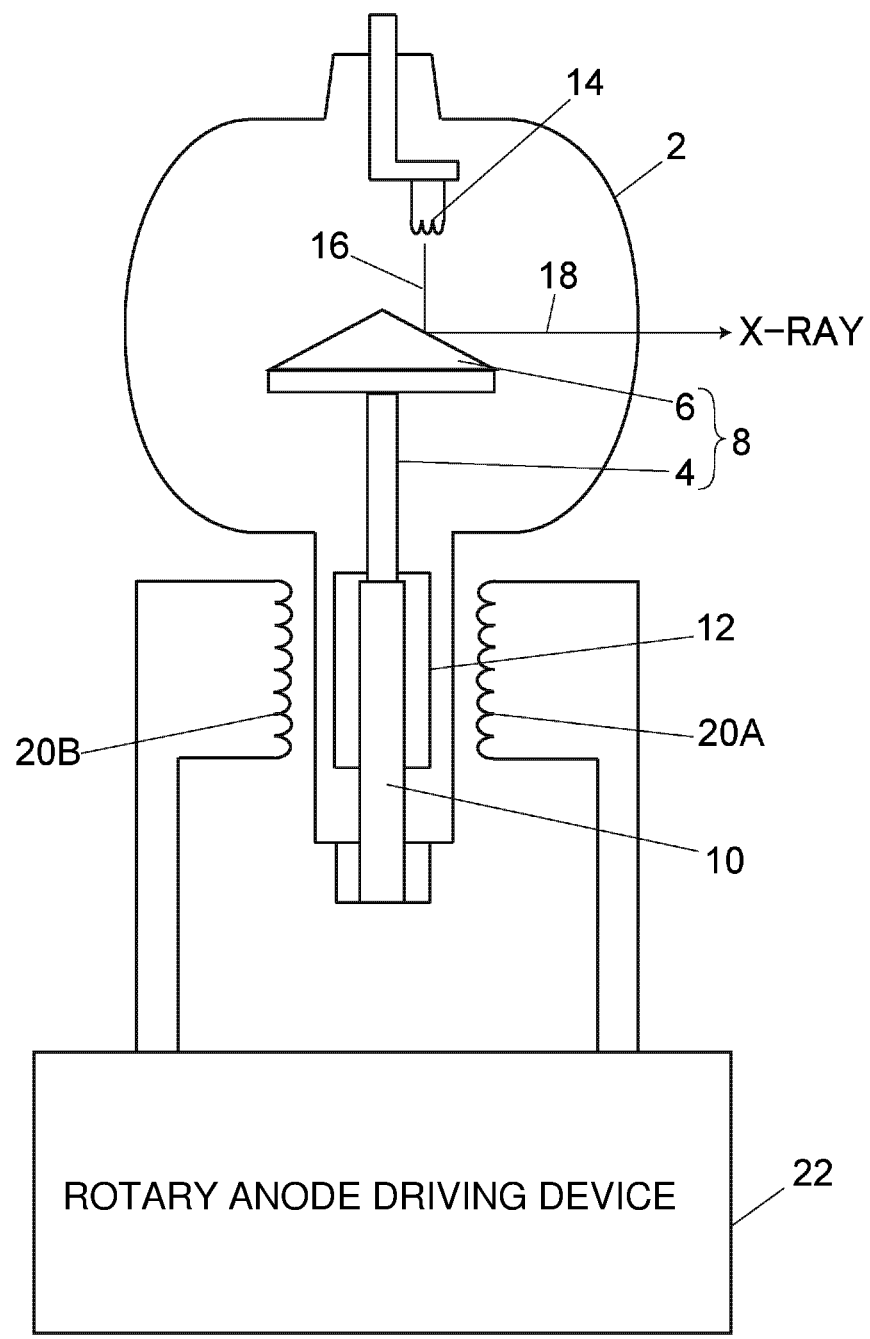
FIG. 4 is a schematic configuration diagram illustrating an embodiment of an X-ray tube apparatus.

FIG. 4 illustrates an embodiment of an X-ray tube apparatus to which the present invention is applied. Here, a two-phase type is illustrated, but basically the same applies to a three-phase type.

In an X-ray tube 2, an anode 8 having an umbrella-shaped target 6 fixed to a tip of a rotary shaft 4 is disposed. The rotary shaft 4 has a base end rotatably supported by a support body 10. A rotor 12 is attached to the rotary shaft 4 in the X-ray tube 2. Further, in the X-ray tube 2, a cathode 14 arranged to face an umbrella-shaped portion of the target 6 and irradiating the target 6 with an electron beam 16 to generate an X-ray 18 is disposed.

In order to rotate the anode 8, stator coils 20A, 20B generating a rotating magnetic field with respect to the rotor 12 are disposed outside the X-ray tube 2. A rotary anode driving device 22 is provided to apply an AC driving voltage for generating a rotating magnetic field to the stator coils 20A, 20B. The rotary anode driving device 22 will be described in detail later.

In such an X-ray tube apparatus, when a driving voltage is applied from the rotary anode driving device 22 to the stator coils 20A, 20B, a rotating magnetic field is generated, and the target 6 is rotated via the rotor 12. As the target 6 rotates, an electron impact area of the target 6 increases to prolong the lifetime of the anode 8, and the current of the electron beam 16 can be increased to increase the amount of generated X-ray 18.

Several embodiments of the rotary anode driving device 22 will be described. Basically, the rotary anode driving device 22 can be configured independently from the X-ray tube 2, and it can be applied to different types of X-ray tubes.

FIG. 1 illustrates a first embodiment of the rotary anode driving device 22. Here, an example in which the present invention is applied to a two-phase type X-ray tube will be described, but applications of the rotary anode driving device 22 of the present invention are not limited to the two-phase type. A three-phase type will be discussed later in another embodiment.

A DC power supply 26 is connected in parallel to an inverter circuit 24, and the inverter circuit 24 generates an AC voltage from a DC voltage of the DC power supply 26 and outputs the AC voltage to X-ray stator coils 28, which include two-phase stator coils 30 and 32 that generate a rotating magnetic field with respect to the rotor 12.

The inverter circuit 24 is a three-phase full bridge inverter circuit having six switching elements Qx1 to Qz2. In the inverter circuit 24, a series circuit of three sets of switching elements constituted of (Qx1, Qx2), (Qy1, Qy2), and (Qz1, Qz2) is connected in parallel to the DC power supply 26. Connecting points between the switching elements of each set are output terminals 38x, 38y, 38z. The output terminals 38x and 38y are connected between both ends of the stator coil 30, and the output terminals 38x and 38z are connected between both ends of the stator coil 32.

What is illustrated as the switching elements Qx1 to Qz2 is one having an insulated gate bipolar transistor (IGBT) 34 and a diode 36 connected in parallel to the IGBT 34. Metal-oxide semiconductor field-effect transistors (MOSFETs) may be used as the switching elements Qx1 to Qz2. Since the MOSFET has a diode function, it is not necessary to separately provide the diode 36. However, the switching elements Qx1 to Qz2 are not limited to the MOSFET.

The DC power supply 26 is also not particularly limited, but in this embodiment, a step-up chopper circuit is used. A DC voltage controller 40 performs PWM control of the step-up chopper circuit to increase the voltage thereof to a predetermined voltage. The voltage of the DC power supply 26 is detected by a DC voltage detector 42. The DC voltage detector 42 may perform an insulated detection method using, for example, a photocoupler.

Of the two-phase stator coils 30, 32, one stator coil 30 is the main coil and the other stator coil 32 is an auxiliary coil. The number of windings of the main coil 30 and the auxiliary coil 32 are such that the auxiliary coil 32 has a larger number of windings than the main coil 30. Lx-y<Lx-z, Rx-y<Rx-z holds, where the inductance of the main coil 30 is Lx-y, the resistance thereof is Rx-y, and the inductance of the auxiliary coil 32 is Lx-z, and the resistance thereof is Rx-z.

In this embodiment, since the impedance of the auxiliary coil 32 is larger than the impedance of the main coil 30, if it is attempted to make the amplitude of magnetic flux generated by the auxiliary coil 32 substantially equal to that of magnetic flux generated by the main coil 30, it is necessary to apply an AC voltage higher than that of the main coil 30 to the auxiliary coil 32. In order to make the amplitude of the AC voltage larger than that of the DC voltage of the DC power supply 26, a capacitor 46 is connected in series to an input side of the auxiliary coil 32. The capacitor 46 has an electrostatic capacitance constituting a series resonant circuit with the auxiliary coil 32.

The magnitude of the electrostatic capacitance is preset by calculation or experiment so as to constitute a series resonant circuit with the auxiliary coil 32. However, the magnitude of the electrostatic capacitance does not need to strictly satisfy the resonance condition, and may be such that, since the impedance of the input circuit from the inverter circuit to the auxiliary coil 32 changes due to a slip, at least a situation that the amplitude of the AC voltage applied to the auxiliary coil 32 is always larger than that when the capacitor 46 is not connected can be maintained by connecting the capacitor 46 in series to the auxiliary coil 32.

The capacitor 46 may always be connected to the auxiliary coil 32. However, in this embodiment, it is configured to be able to select whether the capacitor 46 is connected to the auxiliary coil 32 or not. For this purpose, a bypass circuit 48 is connected in parallel to the capacitor 46, and on an input side of the capacitor 46, a switching mechanism 50 selectively connecting the output of the inverter circuit 24 to either the capacitor 46 or the bypass circuit 48 is disposed. The switching mechanism 50 can be constituted of a power relay or the like.

A PWM waveform generator 44 is provided to perform PWM control of the switching elements Qx1 to Qz2 of the inverter circuit 24 and to generate two-phase AC voltages from the DC voltage of the DC power supply 26.

In order to detect a current amount and a current phase due to the AC voltage applied from the inverter circuit 24 to the stator coils 30 and 32, a current detector 45 is provided in a circuit from the inverter circuit 24 to the stator coils 30, 32. As the current detector 45, for example, a current transformer connected in series to the circuit from the inverter circuit 24 to the stator coils 30, 32 can be used.

A condition storage device 52 is provided for storing waveform conditions and the like according to the operating mode in addition to DC voltage information corresponding to an X-ray tube 2 to be selected.

A waveform calculator 54 is provided. The waveform calculator 54 reads a waveform condition according to at least the type or an operating mode of the X-ray tube 2 from the condition storage device 52 and also reads information on the current amount and the current phase detected by the current detector 45, and calculates a voltage waveform (voltage amplitude and phase difference of each phase) to be output from the PWM waveform generator 44 to the inverter circuit 24 according to the type and the operating mode of the X-ray tube 2 to be selected.

An X-ray high voltage generator 56 is connected for inputting a signal representing the type and the operating mode of the X-ray tube 2 to be selected.

A main controller 58 is provided for issuing a signal to control switching of whether to connect the capacitor 46 to the auxiliary coil 32 or not via the switching element 50 according to the type and the operating mode of the X-ray tube 2 to be selected that are input from the X-ray high voltage generator 56. The main controller 58 also inputs a signal representing information on the type of the X-ray tube 2 to be selected or the operating mode thereof to the waveform calculator 54, reads the DC voltage information corresponding to the X-ray tube 2 to be selected from the condition storage device 52, and outputs the information to the DC voltage controller 40.

The DC voltage controller 40, the PWM waveform generator 44, the condition storage device 52, the waveform calculator 54, and the main controller 58 are achieved by a dedicated computer, a general-purpose personal computer, or a CPU and a memory device, or the like, and the X-ray high voltage generator 56 is achieved by this computer or CPU and an input device thereof.

In the rotary anode driving device having such a configuration, when a signal indicating the type and the operating mode of the X-ray tube 2 to be selected is input from the X-ray high voltage generator 56 to the main controller 58, the main controller 58 outputs a switching signal, as to whether the capacitor 46 connects to the auxiliary coil 32 or not, to the switching element 50 according to the type and the operating mode of the X-ray tube 2 to be selected, and outputs a signal corresponding to the type and operating mode signal of the X-ray tube 2 to be selected to the waveform calculator 54. Further, the main controller 58 reads the DC voltage information corresponding to the type of the X-ray tube 2 to be selected from the condition storage device 52 and outputs the information to the DC voltage controller 40. The waveform calculator 54 reads the waveform condition corresponding to the type and operating mode signal of the X-ray tube 2 from the condition storage device 52, and calculates, together with the information of the DC voltage, the current amount, and the current phase detected by the current detector 45, a voltage waveform condition (voltage amplitude and phase difference of each phase) to be output to the PWM waveform generator 44. The PWM waveform generator 44 converts the voltage waveform condition input from the waveform calculator 54 into a PWM waveform and outputs the PWM waveform to the inverter circuit 24.

Next, voltages to be applied to the main coil 30 and the auxiliary coil 32 will be described with reference to FIGS. 5 and 6.

Figure 5:
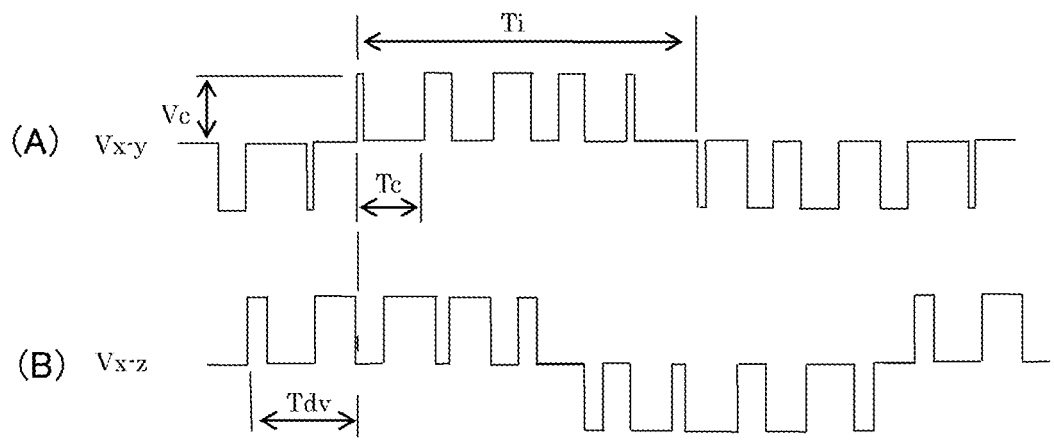
FIG. 5 illustrate examples of PWM voltage waveforms respectively applied from an inverter circuit to a main coil (waveform (A)) and an auxiliary coil in the absence of resonance (waveform (B))
Figure 6:
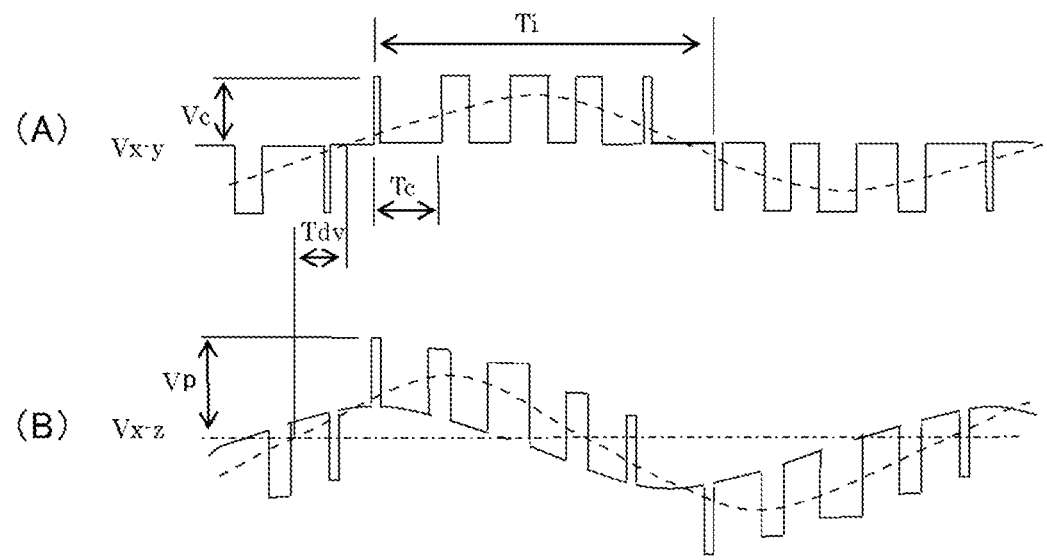
FIG. 6 illustrates examples of PWM voltage waveforms respectively applied from the inverter circuit to the main coil and the auxiliary coil (waveform (A)), in which a capacitor for resonance is connected only to the auxiliary coil (waveform (B))

FIG. 5 illustrates examples of PWM voltage waveforms applied from the inverter circuit 24 to the main coil 30 and the auxiliary coil 32 as the inverter circuit 24 is under PWM control when the switching mechanism 50 is connected to the bypass circuit 48 side and the capacitor 46 is not connected. When the PWM voltage waveform is averaged over time, it becomes an AC voltage waveform.

Symbol Vx-y denotes the voltage applied to the main coil 30, symbol Vx-z denotes the voltage applied to the auxiliary coil 32, symbol Vc denotes a DC voltage of a bus of the inverter circuit 24, that is, an output voltage of the DC power supply 26, symbol Tc denotes a PWM carrier frequency period, symbol Tdv denotes a phase difference of each PWM voltage, and symbol Ti denotes a period of a PWM voltage signal output from the inverter circuit 24.

In the range of the phase difference Tdv, it is necessary to apply a negative voltage as Vx-y and a positive voltage as Vx-z. At this time, operations of the switching elements Qx1 to Qz2 of the inverter circuit 24 of FIG. 1 will be considered.

To apply a negative voltage as Vx-y,
  Qx1: OFF; Qx2: ON,
  Qy1: ON; Qy2: OFF. On the other hand, to apply a positive voltage as Vx-z,
  Qx1: ON; Qx2: OFF,
  Qz1: OFF; Qz2: ON.

In other words, both the period during which the X phase of the inverter circuit 24 is ON and the period during which the X phase is OFF in the PWM carrier frequency period Tc are necessary, and any combination of an average voltage condition and a phase difference in which a moment when the difference between Vx-y and Vx-z is Vc or more exists cannot be output, which is a limitation of the input voltage.

On the other hand, the PWM voltage waveform when the capacitor 46 is connected will be described with reference to FIG. 6. FIG. 6 illustrates examples of PWM voltage waveforms to be applied from the inverter circuit 24 to the main coil 30 (waveform (A)) and the auxiliary coil 32 (waveform (B)) as the inverter circuit 24 is under PWM control when the switching element 50 is connected to the capacitor 46 side and the capacitor 46 is connected to the auxiliary coil 32. No capacitor is connected to the main coil 30. The switching mechanism 50 is connected to the capacitor 46 side at a time of rotation start or high speed rotation mode, and at a time when it is necessary to apply a voltage higher than that of the main coil 30 to the auxiliary coil 32.

In order to apply a voltage higher than that of the main coil 30 to the auxiliary coil 32, it is necessary to make the duty ratio of this PWM voltage waveform high with respect to the auxiliary coil.

An output from the inverter circuit 24 is directly applied to the main coil 30, and an output from the inverter circuit 24 is applied to the auxiliary coil 32 through the capacitor 46. Voltages applied to the main coil 30 and the auxiliary coil 32 are Vx-y and Vx-z, respectively. The solid line illustrates the actual voltage under PWM control, and the broken line illustrates the average thereof. Further, it is assumed that the voltage output from the inverter circuit 24 is a sinusoidal wave when taking the average value of every period of the carrier frequency Tc.

As indicated by the solid line, the voltage Vx-z has such a waveform that the PWM waveform is superimposed on the sinusoidal wave which is the voltage between the capacitors. The voltage amplitude becomes larger than that of the voltage directly applied from the inverter circuit 24 by resonance. Further, the phase advances from the phase of the PWM voltage. That is, the phase difference between the PWM voltages with respect to Vx-y and Vx-z becomes smaller, and the upper limit of the voltage that can be output also increases.

The PWM control of the inverter circuit 24 can be performed so as to maintain the current phase difference between the stator coils to a predetermined phase difference so as not to cause a reduction in rotational torque or the like when the phase difference between the current flowing through the stator coil to which the capacitor is connected and the current flowing through the stator coil to which the capacitor is not connected deviates from the preset current phase difference due to a change in the anode rotational frequency. Thus, the rotational torque can be maintained.

As another embodiment, a phase difference regulator for suppressing or eliminating a deviation from the predetermined phase difference (90° in the case of two phases, 120° in the case of three phases) of the phase difference between the stator coils by feedback control can be provided. The phase difference regulator is constituted of the current detector 45, the PWM waveform generator 44, and the waveform calculator 54 in FIG. 1. The current detector 45 detects the phase of a current flowing through the auxiliary coil 32 to which the main coil 30 and the capacitor 46 are connected, and the waveform calculator 54 feedback controls the inverter circuit 24 via the PWM waveform generator 44 so as to maintain the phase difference between the main coil 30 and the auxiliary coil 32 to a predetermined phase difference, that is, approximately 90°, based on the phase of the current flowing through the main coil 30 and the auxiliary coil 32 detected by the current detector 45. Here, the phase difference of approximately 90° includes that the phase difference is not exactly 90°, but also of that the phase difference is of a degree that does not lead to a decrease in the anode rotational frequency.

Figure 7:
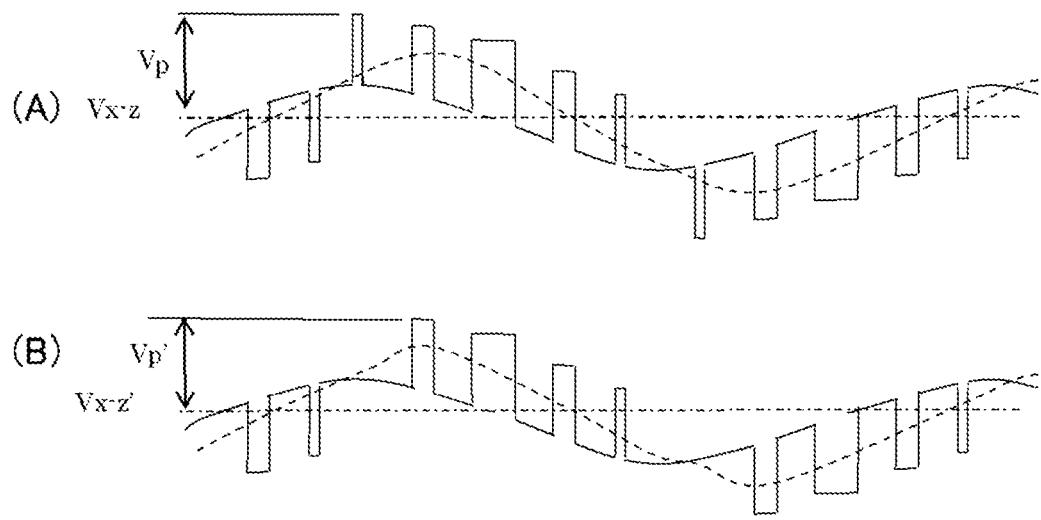
FIG. 7 illustrates a Vx-z voltage waveform (waveform (A)) that is the same as that in FIG. 6, and illustrates Vx-z' (waveform (B)) that is a voltage waveform when the peak of a voltage applied to a stator coil is reduced.

Furthermore, a voltage waveform when the voltage applied to the stator coil is reduced without greatly deteriorating performance by contriving the PWM voltage is illustrated as Vx-z' (waveform (B)) in FIG. 7. The Vx-z voltage waveform (waveform (A)) of FIG. 7 is the same as that of FIG. 6. This is the case of not outputting pulses of a small width not contributing much in the PWM voltage with respect to a time domain where a voltage between the capacitors and a pulse voltage of the PWM voltage are applied to the same polarity of positive or negative. Thus, a peak value Vp of the voltage applied to the stator coil becomes small such as Vp'. The peak value does not significantly affect the average voltage waveform illustrated by the broken line.

Specifically, for example, in FIG. 1, it can be achieved by controlling the inverter circuit 24 by the waveform calculator 54 via the PWM waveform generator 44, with respect to the AC voltage from the inverter circuit 24 output to the auxiliary coil 32 to which the capacitor 46 is connected, so as to make a duty ratio zero when an average value of the PWM voltage (rectangular wave) is in an area of 5% or less of an applied voltage average value indicated by a sinusoidal wave and a polarity thereof is the same as that of the voltage between the capacitors 46.

Figure 8:
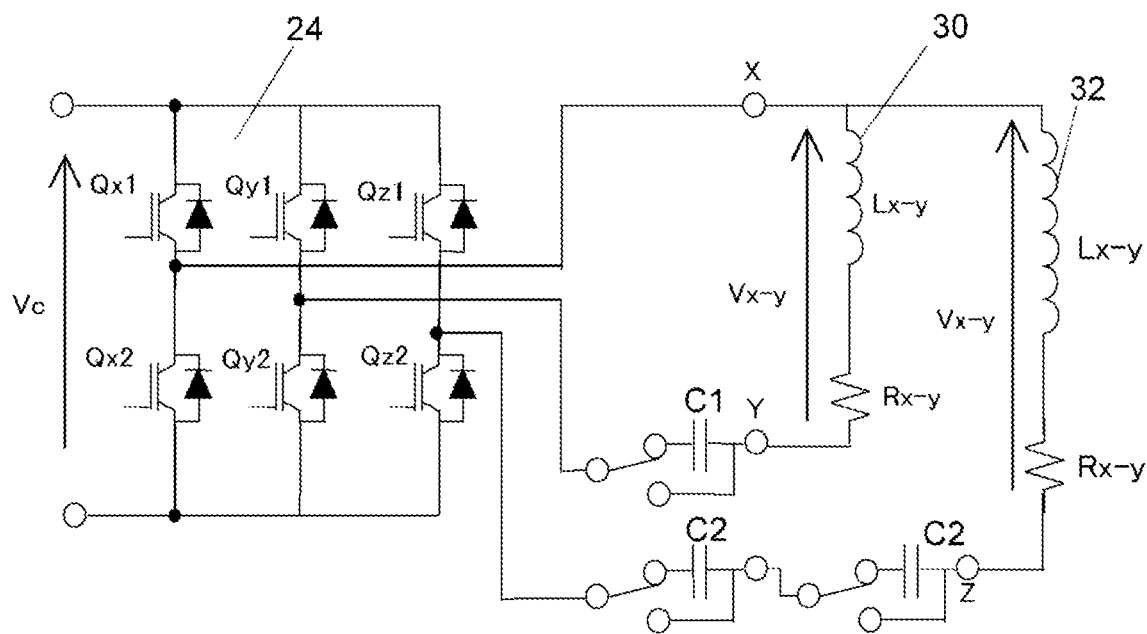
FIG. 8 is a circuit diagram illustrating an embodiment in which capacitors for resonance having different electrostatic capacitances are connected to a main coil and an auxiliary coil in a two-phase type X-ray tube.

FIG. 8 illustrates an embodiment in which, in the two-phase type X-ray stator coils 28 illustrated in FIG. 1, a capacitor C1 having an electrostatic capacitance constituting a series resonant circuit with the main coil 30 is also connected in series to an input side of the main coil 30, and capacitors (C2+C2) connected to the auxiliary coil 32 can be one having a different electrostatic capacitance from that of the capacitor C1 connected to the main coil 30.

In this embodiment, it is possible to select whether to connect no capacitor or one capacitor to the main coil 30 by the bypass circuit and the switching mechanism. Two capacitors are connected in series to the auxiliary coil 32, and one of connecting no capacitor, connecting only one capacitor, or connecting two capacitors in series can be selected by the bypass circuit and the switching mechanism of each capacitor. The electrostatic capacitances of the capacitors C1 and C2 may either be the same or different, but the electrostatic capacitance of the capacitors (C2+C2) is larger than the electrostatic capacitance of C1.

Also in this embodiment, the DC voltage controller 40, the DC voltage detector 42, the current detector 45, the PWM waveform generator 44, the condition storage device 52, the waveform calculator 54, the X-ray high voltage generator 56, and the main controller 58 illustrated in FIG. 1 are included but are omitted in the diagram.

Figure 9:
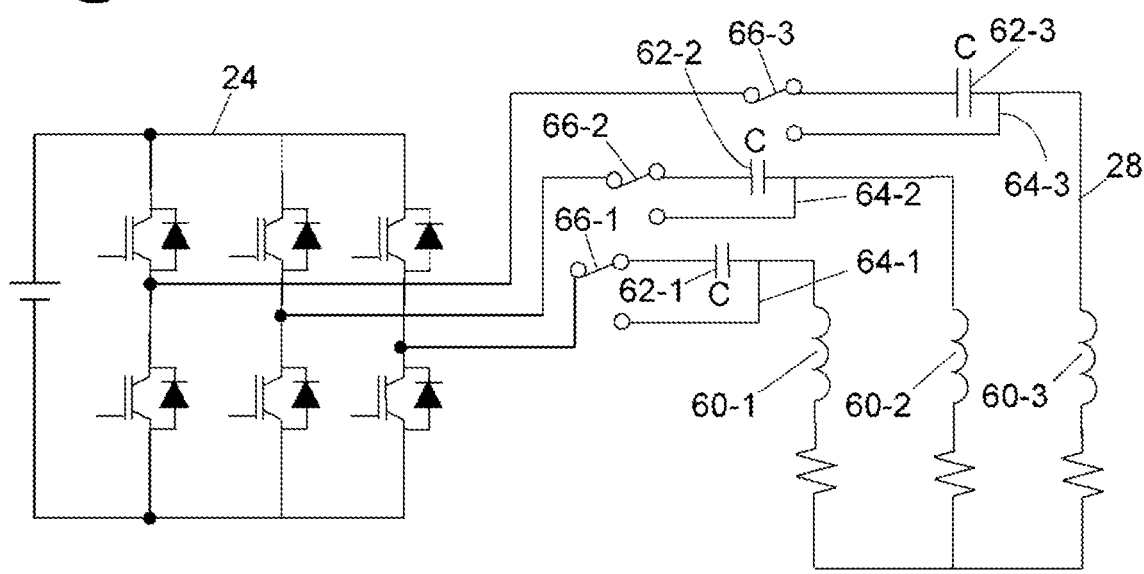
FIG. 9 is an embodiment in the case where the X-ray tube includes a three-phase stator coil.

Still another embodiment is illustrated in which the X-ray tube stator coils 28 has two-phase or three-phase stator coils, all the stator coils have the same number of windings, and on input sides of all the stator coils, capacitors constituting resonant circuits with the respective stator coils are connected respectively. FIG. 9 illustrates an embodiment where the X-ray tube stator coils 28 is provided with three-phase stator coils, but the same applies to the case where two-phase stator coils are provided.

Here, the numbers of windings of the three-phase stator coils 60-1, 60-2, 60-3 are equal to each other. Capacitors 62-1, 62-2, 62-3 constituting the resonant circuits also have equal electrostatic capacitances C for all the stator coils 60-1, 60-2, 60-3. Bypass circuits 64-1, 64-2, 64-3 are provided in parallel to the respective capacitors 62-1, 62-2, 62-3, and on the input side of each of the capacitors 62-1, 62-2, 62-3, a switching mechanism 66-1, 66-2, 66-3 selectively connecting the output of the inverter circuit 24 to one of the capacitors 62-1, 62-2, 62-3 or one of the bypass circuits 64-1, 64-2, 64-3 is provided. Also in this embodiment, the DC voltage controller 40, the DC voltage detector 42, the PWM waveform generator 44, the condition storage device 52, the waveform calculator 54, the X-ray high voltage generator 56, and the main controller 58 illustrated in FIG. 1 are included but are omitted in the diagram.

The resonance phenomenon may be utilized by selecting the capacitors 62-1, 62-2, 62-3 only when a driving voltage with a large amplitude is necessary as in high-speed operation.

Further, in this embodiment, the bypass circuits 64-1, 64-2, 64-3 and the switching mechanisms 66-1, 66-2, 66-3 can be omitted. In that case, the capacitors are connected across all operating modes such as high-speed operation, low-speed operation, rotation maintenance, braking, and the like. Even in such an embodiment, it is possible to use a DC power supply having a DC voltage lower than the power supply voltage necessary for supplying the driving voltage of the amplitude necessary when starting or in high speed operation of the stator coil.

In this embodiment, since the amounts of phase advancement generated in all the stator coils 60-1, 60-2, 60-3 are equal, it is not necessary to regulate a phase difference among the stator coils 60-1, 60-2, 60-3, and the current detector 45 illustrated in FIG. 1 is not always necessary.

What is claimed is:

1. A rotary anode driving device comprising:
   a DC power supply configured to generate a DC voltage;
   a first stator coil;
   an inverter circuit which is connected to the DC power supply and includes a plurality of switching elements, the inverter circuit generates an AC voltage from the DC voltage, and outputs the AC voltage to the first stator coil, which generates a rotating magnetic field of an X-ray tube;
   a pulse width modulation (PWM) waveform generator configured to generate an AC voltage of two phases or three phases as the AC voltage from the DC voltage by performing PWM control of the plurality of switching elements; and
   a first capacitor connected in series to an input side of the first stator coil, the first capacitor having an electrostatic capacitance constituting a series resonant circuit with the first stator coil.

2. The rotary anode driving device according to claim 1, further comprising:
   a bypass circuit connected in parallel to the first capacitor; and
   a switching mechanism, disposed on an input side of the first capacitor, for connecting an output of the inverter circuit to either the first capacitor or the bypass circuit.

3. The rotary anode driving device according to claim 2, further comprising:
   a controller configured to control a switching operation of the switching mechanism so as to select the first capacitor when a type of the X-ray tube or an operating mode of the X-ray tube requires a DC voltage higher than the DC voltage generated by the DC power supply, and to select the bypass circuit when a type of the X-ray tube or an operating mode of the X-ray tube requires a DC voltage equal to or lower than the DC voltage generated by the DC power supply.

4. The rotary anode driving device according to claim 1, further comprising:
   a second stator coil,
   wherein the first stator coil has a larger number of windings than the second stator coil.

5. The rotary anode driving device according to claim 4, further comprising:
   a second capacitor, having an electrostatic capacitance constituting a series resonant circuit with the second stator coil, connected in series to an input side of the second stator coil,
   wherein the first capacitor has a larger electrostatic capacitance than the second capacitor.

6. The rotary anode driving device according to claim 1, further comprising:
   a second stator coil, wherein
   the first stator coil and the second stator coil have a same number of windings, and
   the second stator coil is connected in series to a second capacitor having an electrostatic capacitance constituting a series resonant circuit with the second stator coil.

7. The rotary anode driving device according to claim 1, further comprising:
   a second stator coil; and
   a phase difference regulator configured to regulate a phase difference between the first stator coil and the second stator coil to a predetermined phase difference with respect to a current flowing through the first stator coil.

8. The rotary anode driving device according to claim 7, wherein the phase difference regulator comprises:
   a current detector detecting a phase of a current flowing through each of the first stator coil and the second stator coil;
   the PWM waveform generator; and
   a waveform calculator controlling the inverter circuit via the PWM waveform generator so as to suppress or eliminate a deviation of the phase difference between the first stator coil and the second stator coil from a predetermined phase difference based on a phase of a current flowing through each of the first stator coil and the second stator coil detected by the current detector.

9. The rotary anode driving device according to claim 1, further comprising:
   a waveform calculator controlling the inverter circuit via the PWM waveform generator, with respect to the AC voltage output to the first stator coil, so as to make a duty ratio zero when an average value of a PWM voltage is in an area of a preset ratio or less of an average value of an applied voltage indicated by a sinusoidal wave and a polarity thereof is same as that of a voltage across the first capacitor.

10. The rotary anode driving device according to claim 1, further comprising:
    a second stator coil; and
    a third stator coil, wherein
    the first stator coil, the second stator coil, and the third stator coil have a same number of windings,
    the second stator coil is connected in series to a second capacitor having an electrostatic capacitance constituting a series resonant circuit with the second stator coil, and
    the third stator coil is connected in series to a third capacitor having an electrostatic capacitance constituting a series resonant circuit with the third stator coil.

11. A rotary anode type X-ray tube apparatus comprising:
    the rotary anode driving device according to claim 1; and
    an X-ray tube including:

a rotary shaft;
an anode having a target attached to the rotary shaft and rotatably supported by the rotary shaft;
a rotor attached to the rotary shaft; and
a cathode disposed to oppose the target and irradiating the target with an electron beam, wherein
the rotating magnetic field rotates the rotor.

* * * * *